United States Patent
Vigilant

(10) Patent No.: US 11,256,478 B2
(45) Date of Patent: Feb. 22, 2022

(54) METHOD FOR SECURING A CRYPTOGRAPHIC PROCESS WITH SBOX AGAINST HIGH-ORDER SIDE-CHANNEL ATTACKS

(71) Applicant: THALES DIS FRANCE SA, Meudon (FR)

(72) Inventor: David Vigilant, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 229 days.

(21) Appl. No.: 16/626,887

(22) PCT Filed: Jun. 28, 2018

(86) PCT No.: PCT/EP2018/067421
§ 371 (c)(1),
(2) Date: Dec. 27, 2019

(87) PCT Pub. No.: WO2019/002470
PCT Pub. Date: Jan. 3, 2019

(65) Prior Publication Data
US 2020/0125333 A1 Apr. 23, 2020

(30) Foreign Application Priority Data
Jun. 28, 2017 (EP) .................................. 17305806

(51) Int. Cl.
*G06F 7/76* (2006.01)
*G06F 21/75* (2013.01)
(Continued)

(52) U.S. Cl.
CPC ............ *G06F 7/764* (2013.01); *G06F 21/755* (2017.08); *H04L 9/003* (2013.01); *H04L 9/0631* (2013.01);
(Continued)

(58) Field of Classification Search
CPC .......... G06F 21/755; G06F 2207/7233; G06F 7/764; H04L 2209/04; H04L 2209/16;
(Continued)

(56) References Cited

U.S. PATENT DOCUMENTS 7,403,620 B2 * 7/2008 Liardet ................... H04L 9/003
380/259
7,848,515 B2 * 12/2010 Dupaquis ................ H04L 9/003
380/28

(Continued)

OTHER PUBLICATIONS

Search Query Report from IP.com (performed Sep. 24, 2021). (Year: 2021).*

(Continued)

*Primary Examiner* — Sharon S Lynch
(74) *Attorney, Agent, or Firm* — The Jansson Firm; Pehr B. Jansson

(57) ABSTRACT

The present invention relates to a method for securing against N-order side-channel attacks a cryptographic process using in a plurality of encryption rounds an initial Substitution box $S_0$ comprising the steps of: —generating (E12) a first randomized substitution box $S_1$ by masking said initial substitution box $S_0$ such that $S_1(x \text{ XOR } m_1)=S_0(x) \text{ XOR } m_2$, with $m_1$, $m_2$ uniformly-distributed random values, for any input value x of the initial substitution box $S_0$, —generating (E13) a first transrandomized Substitution box $S(1,1)$ from the first randomized substitution box $S_1$ and from masks $m_{1,1}$, $m'_{1,1}$ such that $S(1, 1)[x]=S_1[x \text{ xor } (m_1 \text{ xor } m_{1,1})] \text{ xor } (m_2 \text{ xor } m'_{1,1})$ for any input value x of the first transrandomized Substitution box S(1,1), —generating (E14) from the first transrandomized Substitution box S(1,1) a N−1th transrandomized Substitution box S(1, N−1) by performing iteratively N−2 times a step of generation of a ith transrandomized Substitution box S(1, i) from a i−1th transrandomized substitution box S(1, i−1) and from a plurality (Continued)

of masks m 1,i, $m'_{1,i}$, $m_{1,i-1}$, $m'_{1,i-1}$ such that $S(1, i)[x]=S(1, i-1)[x \text{ xor } (m_{1,i-1} \text{ xor } m_{1,i})] \text{ xor } (m'_{1,i-1} \text{ xor } m'_{1,i})$ for any input value x of the ith transrandomized substitution box $S(1, i)$, with i an integer comprised in $\{2, \ldots N-1\}$,
—performing the cryptographic process using (E15) the N−1th transrandomized Substitution box $S(1, N-1)$ instead of the initial Substitution box $S_0$ in at least said first round of the cryptographic process.

18 Claims, 3 Drawing Sheets

(51) Int. Cl.
  *H04L 9/00* (2006.01)
  *H04L 9/06* (2006.01)
(52) U.S. Cl.
  CPC .. *G06F 2207/7233* (2013.01); *H04L 2209/04* (2013.01); *H04L 2209/16* (2013.01)
(58) Field of Classification Search
  CPC ....... H04L 9/002; H04L 9/003; H04L 9/0618; H04L 9/0631
  See application file for complete search history.

(56) References Cited

U.S. PATENT DOCUMENTS

| | | | | |
|---|---|---|---|---|
| 10,187,198 | B2* | 1/2019 | Bruneau | G09C 1/00 |
| 10,210,776 | B2* | 2/2019 | Bruneau | G09C 1/00 |
| 10,243,728 | B2* | 3/2019 | Bruneau | H04L 9/0631 |
| 10,461,925 | B2* | 10/2019 | Baker | G06F 21/755 |
| 11,018,849 | B2* | 5/2021 | Baker | G06F 21/556 |
| 2003/0044003 | A1* | 3/2003 | Chari | G06F 21/556 380/28 |
| 2004/0028224 | A1* | 2/2004 | Liardet | H04L 9/0631 380/37 |
| 2007/0180541 | A1* | 8/2007 | Shu | G06F 21/85 726/34 |
| 2008/0019503 | A1* | 1/2008 | Dupaquis | H04L 9/002 380/28 |
| 2010/0246808 | A1* | 9/2010 | Hisakado | H04L 9/0618 380/1 |
| 2012/0144205 | A1* | 6/2012 | Shu | G06F 21/85 713/189 |
| 2012/0250854 | A1* | 10/2012 | Danger | H04L 9/003 380/28 |
| 2014/0351603 | A1* | 11/2014 | Feix | G06F 21/72 713/189 |
| 2016/0105276 | A1* | 4/2016 | Brumley | H04L 9/003 380/28 |
| 2017/0063522 | A1* | 3/2017 | Bruneau | H04L 9/003 |
| 2017/0063523 | A1* | 3/2017 | Bruneau | G09C 1/00 |
| 2017/0063524 | A1* | 3/2017 | Bruneau | H04L 9/005 |
| 2018/0062830 | A1* | 3/2018 | Baker | H04L 9/0631 |
| 2020/0067695 | A1* | 2/2020 | Baker | G06F 21/602 |

OTHER PUBLICATIONS

Carlet Claude et al: "Higher-Order Masking Schemes for S-Boxes", (Mar. 19, 2012), Network and Parallel Computing; [Lecture Notes in Computer Science; Lect. Notes Computer], Springer International Publishing, Cham, pp. 336-384, XP047337543, ISSN: 0302-9743, ISBN: 978-642-27168-7, Sections 3-5, tables 1, 2, 4.

Prouff, Emmanuel et al: "Masking against Side-Channel Attacks: A Formal Security Proof", (May 26, 2013), Network and Parallel Computing; [Lecture Notes in Computer Science; Lect. Notes Computer], Springer International Publishing, Cham, pp. 142-159, XP047411779, ISSN: 0302-9743, ISBN: 978-3-642-27168-7, Sections 4-6.

Pascal Sasdrich et al: "Hiding Higher-Order Side-Channel Leakage—Randomizing Cryptographic Implementations in Reconfigurable Hardware", International Association for Cryptologic Research,, vol. 20161125:141329, (Nov. 24, 2016), pp. 1-16, XP061022237, Sections 3-5.

PCT/EP2018/067421, International Search Report, dated Jul. 9, 2018, European Patent Office, P.B. 5818 Patentlaan 2 NL—2280 HV Rijswijk.

PCT/EP2018/067421, Written Opinion of the International Searching Authority, dated Jul. 9, 2018, European Patent Office, D-80298 Munich, Germany.

* cited by examiner

METHOD FOR SECURING A CRYPTOGRAPHIC PROCESS WITH SBOX AGAINST HIGH-ORDER SIDE-CHANNEL ATTACKS

FIELD OF THE INVENTION

The present invention relates to the field of block cipher encryption, and of associated cryptographic devices, and more particularly to cryptographic devices implementing block cipher while being protected against high order side-channel attacks.

BACKGROUND OF THE INVENTION

Cryptographic algorithms are commonly used for ensuring the privacy of communications by encryption, for authentication or for generating a verifiable signature. An example of such algorithms is block cipher algorithms such as DES or AES, in which input bits of data to be encrypted or decrypted are processed by blocks. Cipher block algorithms often perform encryption or decryption by applying several encryption or decryption rounds. Each round usually involves a substitution box, called Sbox, in order to bring non-linearity to the process and therefore to increase security.

Such cryptographic algorithms are sensitive to side-channel attacks, based on an analysis of the power consumption or electromagnetic signature of the device performing the encryption, as depicted on FIG. 1. A particular type of side-channel attack is Differential Power Analysis (DPA) that performs a statistical analysis of the power consumption on several encryption rounds in order to recover at least some part of the secret key used for the encryption, as depicted on FIG. 3.

A commonly used countermeasure against side-channel attacks such as DPA is the masking of the intermediate values of an encryption process with a random mask. In that case, an attacker performing a side-channel attack at a given point of the encryption process would only get random values and would not obtain any information on the secret key used for the cryptographic process. Nevertheless, a first order masking using one mask can be defeated by a second-order side-channel attack combining information from two attacks, for example at two different rounds of the process.

High-order masking processes have been proposed in which any variable may be split in several parts and each part may be masked by a different mask. A Nth order masking using N different masks then protects against Nth order side-channel attacks. Nevertheless, such a solution may be very costly in the case of masking non-linear operations such as the Sboxes used in block cipher algorithms.

Consequently, there is a need for a block cipher algorithm, and an associated cryptographic device, protected against high-order side-channel attacks while consuming less resources than existing solutions involving high-order splitting of variables to be protected.

SUMMARY OF THE INVENTION

For this purpose and according to a first aspect, this invention therefore relates to a method for securing against N-order side-channel attacks, with N a predetermined integer, a cryptographic process using in a plurality of encryption rounds an initial Substitution box $S_0$ stored in a computer readable memory circuit of a cryptographic device that includes a processing system having at least one hardware processor, comprising performed by the processing system the steps of:

accessing in the computer readable memory circuit said initial Substitution box $S_0$, generating a first randomized substitution box $S_1$ by masking said initial substitution box $S_0$ such that $S_1$ (x XOR $m_1$)=$S_0$(x) XOR $m_2$, with $m_1$, $m_2$ uniformly-distributed random values, for any input value x of the initial substitution box $S_0$, generating a first transrandomized Substitution box S(1,1) from the first randomized substitution box $S_1$ and from masks $m_{1,1}$, $m'_{1,1}$ such that $S(1, 1)[x]=S_1[x$ xor $(m_1$ xor $m_{1,1})]$ xor $(m_2$ xor $m'_{1,1})$ for any input value x of the first transrandomized Substitution box S(1,1), generating from the first transrandomized Substitution box S(1,1) a N−1th transrandomized Substitution box S(1, N−1) by performing iteratively N−2 times a step of generation of a ith transrandomized Substitution box S(1, i) from a i−1th transrandomized substitution box S(1, i−1) and from a plurality of masks $m_{1,i}$, $m'_{1,i}$, $m_{1,i-1}$, $m'_{1,i-1}$ such that $S(1, i)[x]=S(1, i-1)[x$ xor $(m_{1,i-1}$ xor $m_{1,1})]$ xor $(m'_{1,i-1}$ xor $m'_{1,i})$ for any input value x of the ith transrandomized substitution box S(1, i), with i an integer comprised in {2, . . . N−1}, performing the cryptographic process using the N−1th transrandomized Substitution box S(1, N−1) instead of the initial Substitution box $S_0$ in at least said first round of the cryptographic process, where said masks are uniformly-distributed random values and 'XOR' is the Boolean exclusive OR operation, and said operation "transrandomization" of a Substitution box S from ($m_i$, $m_j$) to ($m_k$, $m_l$) consists in computing said Substitution box S masked with said masks $m_k$ and $m_l$, called transrandomized Substitution box, from said Substitution box S masked with said masks $m_i$ and $m_j$, with i, j, k and l integers comprised in {2, . . . N−1}.

The N−1th transrandomized Substitution box S(1, N−1) may be used instead of the initial Substitution box $S_0$ in all rounds of the cryptographic process.

The method according to the first aspect may also comprise when performing each round r, r>1, among said plurality of encryption rounds, called current round:

generating a first transrandomized Substitution box for the current round r S(r, 1) from a N−1th transrandomized substitution box S(r−1, N−1) used instead of the initial Substitution box $S_0$ in the last round (r−1) performed before the current round r and from masks $m_{r,1}$, $m'_{r,1}$ such that $S(r, 1)[x]=S(r-1, N-1)[x$ xor $(m_{r-1,N-1}$ xor $m_{r,1})]$ xor $(m'_{r-1,N-1}$ xor $m'_{r,1})$ for any input value x of the first transrandomized substitution box for the current round S(r, 1), generating from the first transrandomized Substitution box for the current round r S(r, 1) a N−1th transrandomized Substitution box for the current round r S(r, N−1) by performing iteratively N−2 times a step of generation of a ith transrandomized Substitution box for the current round r S(r, i) from a i−1th transrandomized substitution box for the current round r S(r, i−1) and from a plurality of masks $m_{r,i}$, $m'_{r,i}$, $m_{r,i-1}$, $m'_{r,i-1}$ such that $S(r, i)[x]=S(r, i-1)[x$ xor $(m_{r,i-1}$ xor $m_{r,i})]$ xor $(m'_{r,i-1}$ xor $m'_{r,i})$ for any input value x of the ith transrandomized substitution box for the current round S(r, 1), with i an integer comprised in {2, . . . N−1}, using the N−1th transrandomized Substitution box for the current round r S(r, N−1) instead of the initial Substitution box $S_0$ in said current round r of the cryptographic process.

By doing so the cryptographic process is protected against N order side channel analysis attacks at a much lower cost than existing solutions relying on splitting data in multiple shares.

The cryptographic process may be a block cipher algorithm.

For example, the block cipher algorithm may be among the Advanced Encryption Standard (AES) algorithm, the Data Encryption Standard (DES), Blowfish, Serpent, Gost algorithms.

Thus, the invention allows protecting against N order attacks the block encryption rounds of such well-known and very frequently used cryptographic processes.

A memory scrambling may be performed to generate the transrandomized Substitution box S(r,i) at round r with i an integer comprised in $\{1, \ldots N-1\}$.

Such a memory scrambling enables to reduce the cost of applying an input mask to a substitution box compared to actually generating a masked substitution box by permuting all the elements of the original substitution box.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device comprising:
  a processing system having at least one hardware processor configured to execute the steps of the method according to the first aspect,
  a computer readable memory circuit configured for storing said substitution boxes.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at providing a system, and an associated encryption method, solving the issue of protecting against high-order side-channel attacks block cypher encryption operations performed by a cryptographic device 101.

Figure 1:
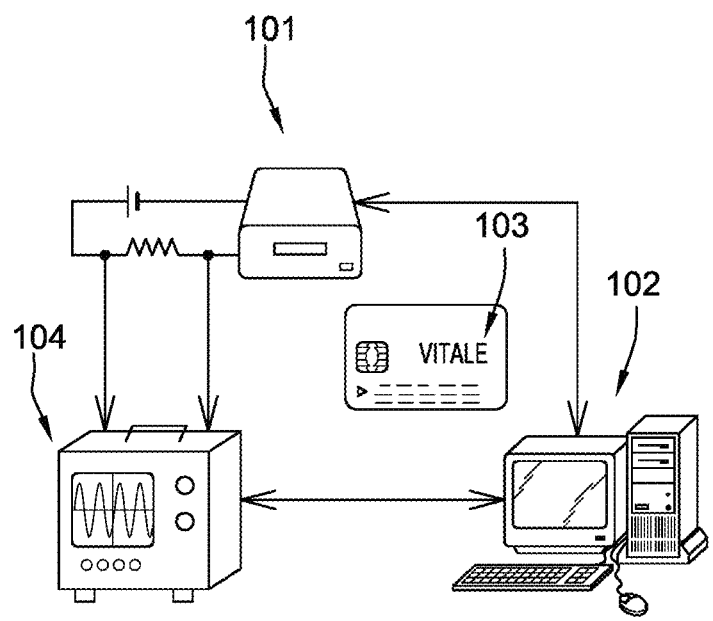
FIG. 1 is a schematic illustration of a system according to an embodiment of the present invention.

As depicted on FIG. 1, such a cryptographic device 101 may be connected to a personal computer or server 102 operated by a user and sending commands to the cryptographic device for cryptographic operations such as data encryption or decryption using a block cipher algorithm such as the Advanced Encryption Standard (AES) algorithm, the Data Encryption Standard (DES), Blowfish, Serpent or Gost algorithms. Alternatively, the cryptographic device 101 may be embedded in the computer 102.

The cryptographic device 101 may include a tamper resistant device 103 secured against any unauthorized access including a processing system having at least one hardware processor for performing cryptographic operations, and a computer readable memory circuit configured for storing the data needed for such operations. Such a cryptographic device may for example be a smartcard reader housing a smartcard device, or an electronic device, such as a smartphone, including a smartchip.

Figure 2:
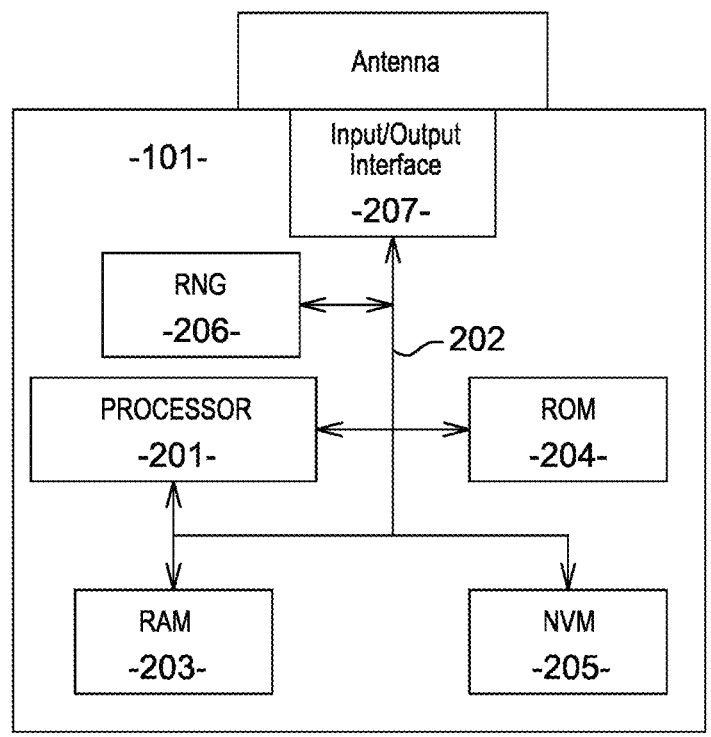
FIG. 2 is a schematic illustration of a cryptographic device according to an embodiment of the present invention.

FIG. 2 is a schematic illustration of the cryptographic device 101. The cryptographic device 101 may include a processing system 201 having at least one hardware processor, connected via a bus 202 to a computer readable memory circuit including a random access memory (RAM) 203, a read-only memory (ROM) 204, and/or a non-volatile memory (NVM) 205. The cryptographic device 101 may also include a random number generator (RNG) 206, included in the hardware processor or connected to it via the bus. The cryptographic device 101 may further include an interface 207 used to connect the cryptographic device 101 to the computer 102. Such an interface may be either a wired interface such as a USB, Ethernet or Thunderbolt interface, or a wireless interface, such as a Bluetooth interface. The interface 207 may also be used to connect the cryptographic device 101 to a wireless network, e.g., wide-area networks, WiFi networks, or mobile telephony networks through which communication may be performed with the computer 102.

The following paragraphs describe the steps of a method for securing against N-order side-channel attacks, with N a predetermined integer, a cryptographic process performed by the cryptographic device 101 according to a first aspect of the invention.

As described above, a commonly used countermeasure against side-channel attacks such as DPA is masking. More particularly in order to protect a block cipher encryption calculation, SBOX calculations can be masked in order to protect the secret data provided as input to the SBOX calculation.

In the rest of this document it is assumed that all masks used in the cryptographic processes are uniformly-distributed random numbers generated by the random number generator 206 of the cryptographic device. In an exemplary embodiment masking any data is done by applying a XOR operation, the Boolean exclusive OR operation, between such data and a mask, but any other arithmetic operation combining the data and the mask, such as an addition, a subtraction, a multiplication . . . may be used instead.

SBOX calculations may be masked on the input side. A data x to be used as input to the SBOX calculation is then masked by an input mask $m_1$ before being provided to the SBOX S for performing the SBOX calculation $S(x \text{ xor } m_1)$.

SBOX calculations may also be masked on the output side. Any output data of the SBOX $S(x)$ is then masked by an output mask $m_2$, producing from an input data x the value $S(x) \text{ xor } m_2$.

Both input masking and output masking may be combined. In the following paragraphs, masking a SBOX calculation using a SBOX S with both an input mask $m_1$ and an output mask $m_2$ will be called "masking the SBOX S with masks $(m_1, m_2)$".

In order to get the value $S(x)$ masked with an output mask $m_2$ from a SBOX calculation using as input masked inputs, despite the non-linearity of the SBOX calculation, a masked SBOX S' masked with $(m_1, m_2)$ may be computed from an original unmasked SBOX S such that $S'(x \text{ XOR } m_1) = S(x) \text{ XOR } m_2$.

Masking inputs with $m_1$ in S' is then equivalent to a permutation of the values in S: a value $S(x)$ located in the original SBOX S at the location corresponding to the input data shall be located in the masked SBOX S' at the location corresponding to the input data $x \text{ XOR } m_1$ in order to get $S(x)$ from the evaluation $S'(x \text{ XOR } m_1)$.

Instead of actually generating a masked SBOX by permuting all the elements of the original SBOX, input masking may be performed by memory scrambling. Matching between a value of the masked SBOX $S'(x \text{ xor } m_1)$ and the input $x \text{ xor } m_1$ is then memorized using virtual memory addressing and input masking is performed by updating memory pointers in order to point towards a masked input $x \text{ xor } m_1$ instead of the original input x. Such a memory scrambling may be performed by software operations handheld by the processing system 201 of the cryptographic device 101 or by a dedicated hardware circuit included in the cryptographic device.

In addition to such an input masking, in order to have $S'(x \text{ XOR } m_1) = S(x) \text{ XOR } m_2$, values in the masked SBOX S' are obtained by masking all the values in the original SBOX S with the output mask $m_2$. Such an output masking may also be performed by software operations handheld by the processing system 201 of the cryptographic device 101 or by a dedicated hardware circuit included in the cryptographic device.

Performing the SBOX calculation using the masked SBOX S' then enables to perform such calculation using a masked value as input $(x \text{ xor } m_1)$ and still to get in output the value of interest $S(x)$, protected with the output mask $m_2$, despite the non-linearity of the SBOX operation.

Figure 3:
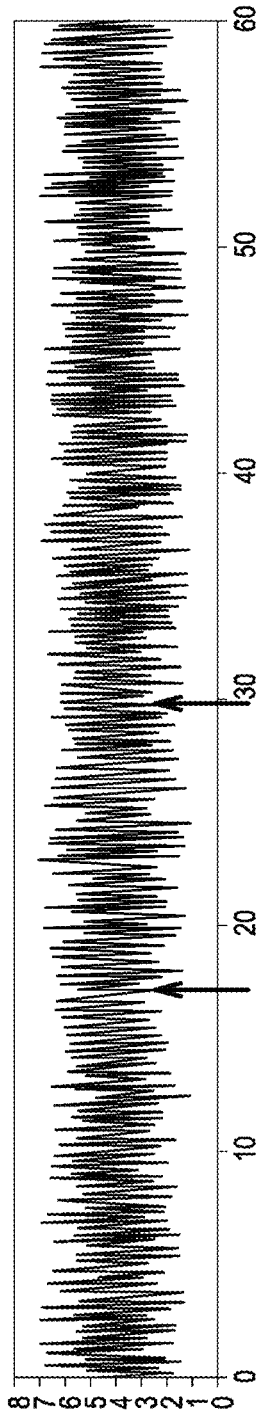
FIG. 3 is a schematic illustration of a high-order side-channel attack.

Unfortunately, such a $(m_1, m_2)$ masking only protects against a first-order attack. An attacker would still be able to recover the input data x of such a SBOX calculation by combining two leakages obtained by side channel analysis attacks, as depicted on FIG. 3, for example using an oscilloscope 104 as depicted on FIG. 1. For example an attacker might get a leakage on $(m_1, m_2)$ from an analysis of the masked SBOX computation, and another leakage on x or $S(x)$ masked with $(m_1, m_2)$ from the block cipher encryption itself, and combine both leakages in order to get information on x or $S(x)$.

In order to defeat such an attack, a first goal of the invention is to prevent such a successful combination of only two leakages by performing the block cipher encryption using a masked SBOX that would not be computed in one step from the original unmasked SBOX. In other words, no masked SBOX computation from the original unmasked SBOX shall be performed using the same masks as the ones masking the masked SBOX used for the block cipher encryption.

In order to do so, the masked SBOX used for the block cipher encryption, for example $S_2$ masked with $(m_3, m_4)$ shall be computed from an already masked SBOX table using different masks, for example $S_1$ masked with $(m_1, m_2)$, itself obtained from the original table. Such an operation is called "transrandomization" from $(m_1, m_2)$ to $(m_3, m_4)$. The transrandomized table $S_2$ is then such that $S_2[x] = S_1[x \text{ xor } (m_1 \text{ xor } m_3)] \text{ xor } (m_2 \text{ xor } m_4)$ for any input value x of the other masked table $S_1$. It can be obtained from $S_1$ by:

masking the input of $S_1$ with $(m_1 \text{ xor } m_3)$ which replaces the input masking of $S_1$ using $m_1$ by an input masking of $S_2$ using $m_3$, and masking the output of $S_2$ with $(m_2 \text{ xor } m_4)$, which replaces the output masking of $S_1$ using $m_2$ by an output masking of $S_2$ using $m_4$.

When the block cipher encryption is performed using such a masked SBOX obtained by transrandomization, assuming that an attacker is able to perform side-channel analysis attacks when the block cipher encryption is performed and when a masked SBOX computation is performed, such an attacker would get:

from an analysis of the block cipher encryption a leakage on x or $S(x)$ masked with $(m_3, m_4)$, and from an analysis of the masking of the original SBOX, ie of the computation of $S_1$, a leakage on $(m_1, m_2)$.

Therefore the attacker cannot get information on the secret input data x or $S(x)$ from the combination of only these two leakages. He must in addition combine these leakages with a third one from the analysis of the transrandomization operation, ie the computation of $S_2$ from $S_1$, giving information on the link between $(m_1, m_2)$ and $(m_3, m_4)$.

As a result such a single transrandomization enables to protect the block cipher encryption against a second order attack and requires the attacker to perform a third order attack in order to be successful.

Figure 4:
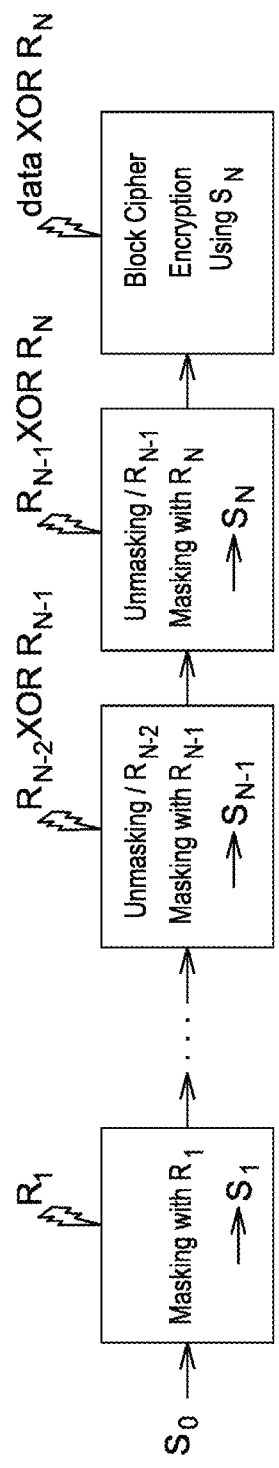
FIG. 4 is a schematic illustration of a transrandomization mechanism iteratively repeated according to an embodiment of the present invention.

In order to protect the block cipher encryption against higher-order attacks, such a transrandomization may be iteratively repeated, as depicted on FIG. 4. In this example, in order to secure against N-order side-channel attacks a block cipher encryption initially designed to be performed with an unmasked initial Substitution box $S_0$, the processing system of the cryptographic device may first generate a first randomized substitution box $S_1$ by masking said initial substitution box $S_0$ such that $S_1(x \text{ XOR } m_1)=S_0(x) \text{ XOR } m_2$, with $m_1$, $m_2$ uniformly-distributed random values, for any input value x of the initial substitution box $S_0$.

Then, the processing system of the cryptographic device may generate from the first randomized substitution box $S_1$ a Nth Substitution box $S_N$ by performing iteratively N−1 times a step of generation of a (i+1)th transrandomized Substitution box $S_{i+1}$ from a ith randomized, when i=1, or transrandomized, when i>1, substitution box $S_1$ and from a plurality of masks $m_{2i-1}$, $m_{2(i+1)-1}$, $m_{2i}$, and $m_{2i+2}$, such that $S_{i+1}[x]=S_i[x \text{ xor } (m_{2i-1} \text{ xor } m_{2(i+1)-1})] \text{ xor } (m_{2i} \text{ xor } m_{2i+2})$ for any input value x of the ith randomized or transrandomized substitution box Si, with i an integer comprised in $\{1, \ldots N-1\}$.

Finally, the processing system of the cryptographic device may perform the block cipher encryption using the Nth transrandomized Substitution box $S_N$ instead of the initial Substitution box $S_0$.

Let us note $R_i$ the set $(m_{2i-1}, m_{2i})$ of the input mask $m_{2i-1}$ and the output mask $m_{2i}$ used as masks for the masked SBOX $S_1$. Assuming that an attacker is able to perform side-channel analysis attacks when the block cipher encryption is performed and when a masked SBOX computation is performed, either from the initial unmasked SBOX $S_0$ or by transrandomization, such an attacker would get:

- from an analysis of the block cipher encryption a leakage on x or S(x) masked with $R_N$,
- from any transrandomization computing a masked SBOX $S_i$, a leakage on $R_{i-1}$ xor $R_i$,
- and from an analysis of the masking of the initial SBOX, ie of the computation of $S_1$, a leakage on $R_1$.

Such transrandomization computations of masked SBOXs $S_i$ shall be performed in a way leaking only information on $R_{i-1}$ xor $R_i$. It shall not leak information on $R_{i-1}$ only or $R_i$ only for example by performing an intermediate calculation using only the masks of $R_{i-1}$ or $R_i$. For example the processing system of the cryptographic device in order to perform the "xor ($m_{2i}$ xor $m_{2i+2}$)" operation on the values of the transrandomized SBOX shall not perform first a "xor $m_{2i}$" in order to prevent a leakage on $m_{2i}$.

Therefore in order to get information on x or S(x), the attacker must combine the N+1 leakages from: the block cipher encryption, all (N−1) transrandomization operations, and the masking of the initial SBOX.

In an embodiment, the level of protection may be adapted to a particular context of operation by selecting on-the-fly the number of transrandomization operations to be performed, ie the value of N, before performing the block cipher encryption operation.

In an alternative embodiment, all needed $m_j$ xor $m_{j+2}$ values (j being an integer) may be precomputed, stored in the computer readable memory circuit of the cryptographic device 101, and used later by the processing system of the cryptographic device when performing a transrandomization operation.

Cryptographic processes such as AES or DES block cipher perform several encryption rounds. In order to secure such processes, transrandomizations may be performed before performing the first encryption round of the process.

Let us note S(1, i) the ith transrandomized substitution box SBOX for the first round, with i an integer comprised in $\{1, \ldots N-1\}$, and, $R_{1,0}$ the set of input/output masks $(m_1, m_2)$ used as masks for the first randomized SBOX of the first round $S_1$, and $R_{1,i}$ the set $(m_{1,i}, m'_{1,i})$ of the input mask $m_{1,i}$ and the output mask $m'_{1,i}$ used as masks for the ith transrandomized substitution box SBOX for the first round S(1, i).

Figure 5:
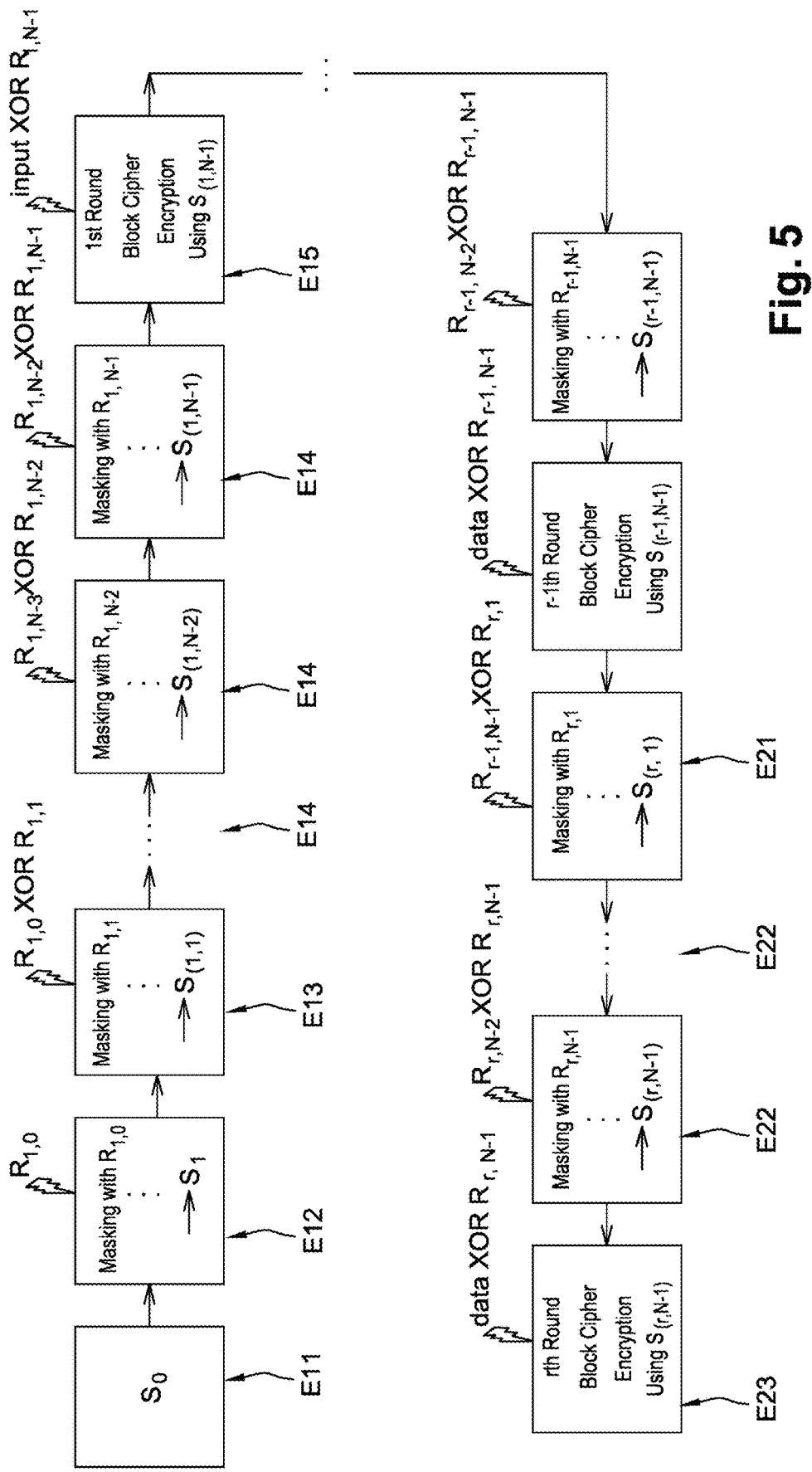
FIG. 5 illustrates schematically a method of securing against N-order side-channel attacks according to an embodiment of the present invention.

According to a first aspect, the invention relates to a method for securing against N-order side-channel attacks, with N a predetermined integer, a cryptographic process using in a plurality of encryption rounds an initial Substitution box $S_0$ stored in the computer readable memory circuit of the cryptographic device, comprising the following steps described on FIG. 5 and performed by the processing system:

- during a first initialization step E11, accessing in the computer readable memory circuit said initial Substitution box $S_0$,
- during a second initialization step E12 generating a first randomized substitution box $S_1$ by masking said initial substitution box $S_0$ such that $S_1(x \text{ XOR } m_1)=S_0(x) \text{ XOR } m_2$, with $m_1$, $m_2$ uniformly-distributed random values, for any input value x of the initial substitution box $S_0$,
- during a third initialization step E13 generating a first transrandomized Substitution box S(1,1) from the first randomized substitution box $S_1$ and from masks $m_{1,i}$, $m'_{1,1}$ such that $S(1, 1)[x]=S_1[x \text{ xor } (m_1 \text{ xor } m_{1,1})] \text{ xor } (m_2 \text{ xor } m'_{1,1})$ for any input value x of the first transrandomized Substitution box S(1,1)
- during a fourth initialization step E14 generating from the first transrandomized Substitution box S(1,1) a N−1th transrandomized Substitution box S(1, N−1) by performing iteratively N−2 times a step of generation of a ith transrandomized Substitution box S(1, i) from a i−1th transrandomized substitution box S(1, i−1) and from a plurality of masks $m_{1,i}$, $m'_{1,i}$, $m_{1,i-1}$, $m'_{1,i-1}$ such that $S(1, i)[x]=S(1, i-1)[x \text{ xor } (m_{1,i-1} \text{ xor } m_{1,i})] \text{ xor } (m'_{1,i-1} \text{ xor } m'_{1,i})$ for any input value x of the ith transrandomized substitution box S(1, i), with i an integer comprised in $\{2, \ldots N-1\}$,
- performing the cryptographic process using the N−1th transrandomized Substitution box S(1, N−1) instead of the initial Substitution box $S_0$ in at least said first round of the cryptographic process during a fifth initialization step E15.

The N−1th transrandomized Substitution box S(1, N−1) may be used instead of the initial Substitution box $S_0$ in all rounds of the cryptographic process.

Unfortunately, an attacker may combine leakages from block cipher encryptions of several rounds. If two block cipher encryption rounds were computed with the same masked SBOX, an attacker combining leakages from these two rounds may retrieve information on the secret value used as input to the whole encryption process.

Therefore, in order to keep this cryptographic process protected against N-order attacks even when an attacker combines leakages from several rounds, SBOX masking may be modified before each new round of the process. In order to do so, as depicted on FIG. 5, transrandomizations according to the invention may be performed before each new round of the process.

Let us note S(r, i) the ith transrandomized substitution box SBOX for the $r_{th}$ round, with i an integer comprised in $\{1, \ldots N-1\}$, and, $R_{1,0}$ the set of input/output masks $(m_1, m_2)$ used as masks for the first randomized SBOX of the first round $S_1$, and $R_{r,i}$ the set $(m_{r,i}, m'_{r,i})$ of the input mask $m_{r,i}$ and the output mask $m'_{r,i}$ used as masks for the ith transrandomized substitution box SBOX for the $r_{th}$ round S(r, i).

Consequently, the method according to the first aspect may also comprise, when performing each round r, r>1, among said plurality of encryption rounds, called current round:

during a first post-encryption step E21, generating a first transrandomized Substitution box for the current round r S(r, 1), from a N−1th transrandomized substitution box S(r−1, N−1) used instead of the initial Substitution box $S_0$ in the last round (r−1) performed before the current round r, and from masks $m_{r,1}$, $m'_{r,i}$ such that S(r, 1)[x]=S(r−1, N−1)[x xor ($m_{r−1,N−1}$ xor $m_{r,1}$)] xor ($m'_{r−1,N−1}$ xor $m'_{r,1}$) for any input value x of the first randomized substitution box for the current round S(r, 1), during a second post-encryption step E22, generating from the first transrandomized Substitution box for the current round r S(r, 1) a N−1 th transrandomized Substitution box for the current round r S(r, N−1) by performing iteratively N−2 times a step of generation of a ith transrandomized Substitution box for the current round r S(r, i) from a i−1th transrandomized substitution box for the current round r S(r, i−1) and from a plurality of masks $m_{r,i}$, $m'_{r,i}$, $m_{r,i−1}$, $m'_{r,i−1}$ such that S(r, i)[x]=S(r, i−1)[x xor ($m_{r,i−1}$ xor $m_{r,i}$)] xor ($m'_{r,i−1}$ xor $m'_{r,i}$) for any input value x of the ith transrandomized substitution box for the current round S(r, 1), with i an integer comprised in {2, ... N−1}, during a third post-encryption step E23, using the N−1th transrandomized Substitution box S(r, N−1) instead of the initial Substitution box $S_0$ in said current round r of the cryptographic process.

Assuming that an attacker is able to perform side-channel analysis attacks when a block cipher encryption is performed and when a masked SBOX computation is performed by transrandomization, such an attacker would get, as shown on FIG. 5:

from an analysis of the block cipher encryption at round r a leakage on x or S(x) masked with $R_{r, N−1}$, from the transrandomizations performed between block cipher encryptions at round r and r−1, leakages on ($R_{r−1, N−1}$ xor $R_{r, 1}$) and $R_{r, i−1}$ xor $R_{r, i}$ with i in {2, ..., N−1}, and from an analysis of the block cipher encryption at round r−1 a leakage on x or S(x) masked with $R_{r−1, N−1}$.

Therefore in order to get information on x or S(x), the attacker must combine the N+1 leakages from: the block cipher encryptions at rounds r and r−1, and from all transrandomization operations performed in-between.

As a result the block cipher algorithm protected by such a cryptographic device is protected against any-order side-channel attacks provided that enough transrandomization operations are performed between each block cipher calculation, without requiring any splitting of the input data in multiple shares, and at a limited cost both in terms of memory and processing power.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device 101 comprising:

a processing system having at least one hardware processor 201 configured to execute the steps of the method according to the first aspect, a computer readable memory circuit 203, 204, 205 configured for storing said substitution boxes.

The invention claimed is:

1. A method for securing a cryptographic device against N-order side-channel attacks, wherein N is a predetermined integer, wherein the method comprises:

performing the following steps by a processing system of the cryptographic device using a cryptographic process, comprising a plurality of encryption rounds including an initial Substitution box $S_0$, stored in a computer readable memory circuit of the cryptographic device that includes the processing system having at least one hardware processor:

accessing in the computer readable memory circuit said initial Substitution box S0, generating a first randomized substitution box $S_1$ by masking said initial substitution box S0 such that $S_1$(x XOR $m_1$)=$S_0$(x) XOR $m_2$, with $m_1$, $m_2$ uniformly-distributed random values, for any input value x of the initial substitution box $S_0$, generating a first transrandomized Substitution box S(1,1) from the first randomized substitution box $S_1$ and from masks $m_{1,1}$, $m'_{1,1}$ such that S(1, 1) [x]=$S_1$[x xor ($m_1$ xor $m_{1,1}$)] xor ($m_2$ xor $m'_{1,1}$) for any input value x of the first transrandomized Substitution box S(1,1), generating from the first transrandomized Substitution box S(1,1) a N−1th transrandomized Substitution box S(1, N−1) by performing iteratively N−2 times a step of generation of a ith transrandomized Substitution box S(1, i) from a i−1th transrandomized substitution box S(1, i−1) and from a plurality of masks $m_{1,i}$, $m'_{1,i}$, $m_{1,i−1}$, $m'_{1,i−1}$ such that S(1, i)[x]= S(1, i−1)[x xor ($m_{1,i−1}$ xor $m_{1,i}$)] xor ($m'_{1,i−1}$ xor $m'_{1,i}$) for any input value x of the ith transrandomized substitution box S(1, i), with i an integer comprised in {2, ... N−1}, performing the cryptographic process using the N−1th transrandomized Substitution box S(1, N−1) instead of the initial Substitution box S0 in at least said first round of the cryptographic process, where said masks are uniformly-distributed random values, XOR is the Boolean exclusive OR operation, and performing said transrandomization of a Substitution box S from ($m_i$, $m_j$) to ($m_k$, $m_l$) consists in computing said Substitution box S masked with said masks $m_k$ and $m_l$, called transrandomized Substitution box, from said Substitution box S masked with said masks $m_i$ and $m_j$ with i, j, k and l comprising integers in {2, ... N−1}.

2. The method of claim 1, wherein the N−1th transrandomized Substitution box S(1, N−1) is used instead of the initial Substitution box $S_0$ in all rounds of the cryptographic process.

3. The method of claim 1, further comprising when performing each round r, r>1, among said plurality of encryption rounds, called a current round:

generating a first transrandomized Substitution box for the current round r S(r, 1) from a N−1th transrandomized substitution box S(r−1, N−1) used instead of the initial Substitution box S0 in the last round (r−1) performed before the current round r and from masks $m_{r,1}$, $m'_{r,1}$ such that S(r, 1)[x]=S(r−1, N−1)[x xor ($m_{r−1, N−1}$ xor $m_{r,1}$)] xor ($m'_{r-1,N-1}$ xor $m'_{r,1}$) for any input value x of the first transrandomized substitution box for the current round S(r, 1), generating from the first transrandomized Substitution box for the current round r S(r, 1) a N−1th transrandomized Substitution box for the current round r S(r, N−1) by performing iteratively N−2 times a step of generation of a ith transrandomized Substitution box for the current round r S(r, i) from a i−1th transrandomized substitution box for the current round r S(r, i−1) and from a plurality of masks $m_{r,i}$, $m'_{r,i}$, $m_{r,i-1}$, $m'_{r,i-1}$ such that S(r, i)[x]=S(r,i−1)[x xor ($m_{r,i-1}$ xor $m_{r,i}$)] xor ($m'_{r,i-1}$ xor m'r,i) for any input value x of the ith transrandomized substitution box for the current round S(r, 1), with i an integer comprised in {2, . . . N−1}, and using the N−1th transrandomized Substitution box for the current round r S(r, N−1) instead of the initial Substitution box $S_0$ in said current round r of the cryptographic process.

4. The method of claim 1, wherein the cryptographic process is a block cipher algorithm.

5. The method of claim 4, wherein the block cipher algorithm is selected among the set including Advanced Encryption Standard (AES) algorithm, Data Encryption Standard (DES) algorithm, Blowfish algorithm, Serpent algorithm, and Gost algorithm.

6. The method of claim 3, wherein a memory scrambling is performed to generate the transrandomized Substitution box S(r,i) at round r with i an integer comprised in (1, . . . N−1).

7. A computer program product stored in the memory of at least one cryptographic device, having at least one hardware processor, comprising software code instructions, when executed by the at least one processor, secures the at least one cryptographic device against N-order side-channel attacks, wherein N is a predetermined integer, the software instructions comprising instructions causing the at least one hardware processor to:

perform the following steps using a cryptographic process, comprising a plurality of encryption rounds including an initial Substitution box $S_0$, stored in a computer readable memory circuit of the cryptographic device:

accessing in the computer readable memory circuit said initial Substitution box S0, generating a first randomized substitution box $S_1$ by masking said initial substitution box S0 such that $S_1$ (x XOR $m_1$)=$S_0$(x) XOR $m_2$, with m1, m2 uniformly-distributed random values, for any input value x of the initial substitution box $S_0$, generating a first transrandomized Substitution box S(1,1) from the first randomized substitution box $S_1$ and from masks $m_{1,1}$, $m'_{1,1}$ such that S(1, 1) [x]=$S_1$[x xor ($m_1$ xor $m_{1,1}$)] xor ($m_2$ xor $m'_{1,1}$) for any input value x of the first transrandomized Substitution box S(1,1), generating from the first transrandomized Substitution box S(1,1) a N−1th transrandomized Substitution box S(1, N−1) by performing iteratively N−2 times a step of generation of a ith transrandomized Substitution box S(1, i) from a i−1th transrandomized substitution box S(1, i−1) and from a plurality of masks $m_{1,i}$, $m'_{1,i}$, $m_{1,i-1}$, $m'_{1,i-1}$ such that S(1, i)[x]=S(1, i−1)[x xor ($m_{1,i-1}$ xor $m_{1,i}$)] xor ($m'_{1,i-1}$ xor $m'_{1,i}$) for any input value x of the ith transrandomized substitution box S(1, i), with i an integer comprised in {2, . . . N−1}, performing the cryptographic process using (E15) the N−1th transrandomized Substitution box S(1, N−1) instead of the initial Substitution box S0 in at least said first round of the cryptographic process, where said masks are uniformly-distributed random values, XOR is the Boolean exclusive OR operation, and performing said transrandomization of a Substitution box S from ($m_i$, $m_j$) to ($m_k$, $m_l$) consists in computing said Substitution box S masked with said masks $m_k$ and $m_l$ called transrandomized Substitution box, from said Substitution box S masked with said masks $m_i$ and $m_j$, with i, j, k and l comprising integers in {2, . . . N−1}.

8. A non-transitory computer readable medium storing executable computer code that when executed by a cryptographic device, having a processing system including at least one hardware processor, secures the at least one cryptographic device against N-order side-channel attacks, wherein N is a predetermined integer, the computer code comprising computer code for causing the at least one hardware processor to:

perform the following steps using a cryptographic process, including a plurality of encryption rounds including an initial Substitution box $S_0$, stored in a computer readable memory circuit of the cryptographic device:

accessing in the computer readable memory circuit said initial Substitution box S0, generating a first randomized substitution box $S_1$ by masking said initial substitution box S0 such that $S_1$ (x XOR $m_1$)=$S_0$(x) XOR $m_2$, with m1, m2 uniformly-distributed random values, for any input value x of the initial substitution box $S_0$, generating a first transrandomized Substitution box S(1,1) from the first randomized substitution box $S_1$ and from masks $m_{1,1}$, $m'_{1,1}$ such that S(1, 1)[x]=$S_1$[x xor ($m_1$ xor $m_{1,1}$)] xor ($m_2$ xor $m'_{1,i}$) for any input value x of the first transrandomized Substitution box S(1,1), generating from the first transrandomized Substitution box S(1,1) a N−1th transrandomized Substitution box S(1, N−1) by performing iteratively N−2 times a step of generation of a ith transrandomized Substitution box S(1, i) from a i−1th transrandomized substitution box S(1, i−1) and from a plurality of masks $m_{1,i}$, $m'_{1,i}$, $m_{1,i-1}$, $m'_{1,i-1}$ such that S(1, i)[x]=S(1, i−1)[x xor ($m_{1,i-1}$ xor $m_{1,i}$)] xor ($m'_{1,i-1}$ xor $m'_{1,i}$) for any input value x of the ith transrandomized substitution box S(1, i), with i an integer comprised in {2, . . . N−1}, performing the cryptographic process using (E15) the N−1th transrandomized Substitution box S(1, N−1) instead of the initial Substitution box S0 in at least said first round of the cryptographic process, where said masks are uniformly-distributed random values, XOR is the Boolean exclusive OR operation, and performing said transrandomization of a Substitution box S from ($m_i$, $m_j$) to ($m_k$, $m_l$) consists in computing said Substitution box S masked with said masks $m_k$ and $m_l$ called transrandomized Substitution box, from said Substitution box S masked with said masks $m_i$ and $m_j$, with i, j, k and l comprising integers in {2, . . . N−1}.

9. A cryptographic device comprising:

a processing system having at least one hardware processor, a computer readable memory circuit configured for storing substitution boxes, wherein the processing system performs the following steps to secure against N-order side-channel attacks, wherein N comprises a predetermined integer, using a cryptographic process in a plurality of encryption rounds:

accessing in the computer readable memory circuit of the cryptographic device an initial Substitution box $S_0$, generating a first randomized substitution box $S_1$ by masking said initial substitution box $S_0$ such that $S_1$ (x XOR $m_1$)=$S_0$ (x) XOR $m_2$, with $m_1$, $m_2$ uniformly-distributed random values, for any input value x of the initial substitution box $S_0$, generating a first transrandomized Substitution box $S(1,1)$ from the first randomized substitution box $S_1$ and from masks $m_{1,1}$, $m'_{1,1}$ such that $S(1, 1)$ [x]=$S_1$ [x xor ($m_1$ xor $m_{1,1}$)] xor ($m_2$ xor $m'_{1,1}$) for any input value x of the first transrandomized Substitution box $S(1,1)$, generating from the first transrandomized Substitution box $S(1,1)$ a N-1th transrandomized Substitution box $S(1, N-1)$ by performing iteratively N-2 times a step of generation of a ith transrandomized Substitution box $S(1, i)$ from a i-1th transrandomized substitution box $S(1, i-1)$ and from a plurality of masks $m_{1,i}$, $m'_{1,i}$, $m_{1,i-1}$, $m'_{1,i-1}$ such that $S(1, i)[x]=S(1, i-1)[x$ xor $(m_{1,i-1}$ xor $m_{1,i})]$ xor $(m'_{1,i-1}$ xor $m'_{1,i})$ for any input value x of the ith transrandomized substitution box $S(1, i)$, with i an integer comprised in $\{2, \ldots N-1\}$, performing the cryptographic process using the N-1th transrandomized Substitution box $S(1, N-1)$ instead of the initial Substitution box $S_0$ in at least said first round of the cryptographic process, where said masks are uniformly-distributed random values, XOR is the Boolean exclusive OR operation, and said transrandomization operation of a Substitution box S from ($m_i$, $m_j$) to ($m_k$, $m_l$) consists in computing said Substitution box S masked with said masks $m_k$ and $m_l$ called a transrandomized Substitution box, from said Substitution box S masked with said masks $m_i$ and $m_j$, with i, j, k and l comprising integers in $\{2, \ldots N-1\}$.

10. The computer program of claim 7, wherein the N-1th transrandomized Substitution box $S(1, N-1)$ is used instead of the initial Substitution box $S_0$ in all rounds of the cryptographic process.

11. The computer program of claim 7, wherein the method further includes, when performing each round r, r>1, among said plurality of encryption rounds, called current round:

generating a first transrandomized Substitution box for the current round r $S(r, 1)$ from a N-1th transrandomized substitution box $S(r-1, N-1)$ used instead of the initial Substitution box S0 in the last round (r-1) performed before the current round r and from masks $m_{r,1}$, $M'_{r,1}$ such that $S(r, 1)[x]=S(r-1, N-1)[x$ xor $(m_{r-1,N-1}$ xor $m_{r,1})]$ xor $(m'_{r-1,N-1}$ xor $m'_{r,1})$ for any input value x of the first transrandomized substitution box for the current round $S(r, 1)$, generating from the first transrandomized Substitution box for the current round r $S(r, 1)$ a N-1th transrandomized Substitution box for the current round r $S(r, N-1)$ by performing iteratively N-2 times a step of generation of a ith transrandomized Substitution box for the current round r $S(r, i)$ from a i-1th transrandomized substitution box for the current round r $S(r, i-1)$ and from a plurality of masks $m_{r,i}$, $m'_{r,i}$, $m_{r,i-1}$, $m'_{r,i-1}$ such that $S(r, i)[x]=S(r,i-1)[x$ xor $(m_{r,i-1}$ xor $m_{r,i})]$ xor $(m'_{r,i-1}$ xor m'r,i) for any input value x of the ith transrandomized substitution box for the current round $S(r, 1)$, with i an integer comprised in $\{2, \ldots N-1\}$, and using the N-1th transrandomized Substitution box for the current round r $S(r, N-1)$ instead of the initial Substitution box $S_0$ in said current round r of the cryptographic process.

12. The computer program of claim 7, wherein a memory scrambling is performed to generate the transrandomized Substitution box $S(r,i)$ at round r with i an integer comprised in $\{1, \ldots N-1\}$.

13. The non-transitory memory of claim 8 wherein the N-1th transrandomized Substitution box $S(1, N-1)$ is used instead of the initial Substitution box S0 in all rounds of the cryptographic process.

14. The non-transitory memory of claim 8, wherein the method further includes, when performing each round r, r>1, among said plurality of encryption rounds, called current round:

generating a first transrandomized Substitution box for the current round r $S(r, 1)$ from a N-1th transrandomized substitution box $S(r-1, N-1)$ used instead of the initial Substitution box S0 in the last round (r-1) performed before the current round r and from masks $m_{r,1}$, $m'_{r,1}$ such that $S(r, 1)[x]=S(r-1, N-1)[x$ xor $(m_{r-1,N-1}$ xor $m_{r,1})]$ xor $(m'_{r-1,N-1}$ xor $m'_{r,1})$ for any input value x of the first transrandomized substitution box for the current round $S(r, 1)$, generating from the first transrandomized Substitution box for the current round r $S(r, 1)$ a N-1th transrandomized Substitution box for the current round r $S(r, N-1)$ by performing iteratively N-2 times a step of generation of a ith transrandomized Substitution box for the current round r $S(r, i)$ from a i-1th transrandomized substitution box for the current round r $S(r, i-1)$ and from a plurality of masks $m_{r,i}$, $m'_{r,i}$, $m_{r,i-1}$, $m'_{r,i-1}$ such that $S(r, i)[x]=S(r,i-1)[x$ xor $(m_{r,i-1}$ xor $m_{r,i})]$ xor $(m'_{r,i-1}$ xor m'r,i) for any input value x of the ith transrandomized substitution box for the current round $S(r, 1)$, with i an integer comprised in $\{2, \ldots N-1\}$, and using the N-1th transrandomized Substitution box for the current round r $S(r, N-1)$ instead of the initial Substitution box $S_0$ in said current round r of the cryptographic process.

15. The non-transitory memory of claim 8, wherein a memory scrambling is performed to generate the transrandomized Substitution box $S(r,i)$ at round r with i an integer comprised in $\{1, \ldots N-1\}$.

16. The cryptographic device of claim 9, wherein the N-1th transrandomized Substitution box $S(1, N-1)$ is used instead of the initial Substitution box S0 in all rounds of the cryptographic process.

17. The cryptographic device of claim 9, wherein the method further includes, when performing each round r, r>1, among said plurality of encryption rounds, called current round:

generating a first transrandomized Substitution box for the current round r $S(r, 1)$ from a N-1th transrandomized substitution box $S(r-1, N-1)$ used instead of the initial Substitution box S0 in the last round (r-1) performed before the current round r and from masks $m_{r,1}$, $m'_{r,1}$ such that $S(r, 1)[x]=S(r-1, N-1)[x$ xor $(m_{r-1,N-1}$ xor $m_{r,1})]$ xor $(m'_{r-1,N-1}$ xor $m'_{r,1})$ for any input value x of the first transrandomized substitution box for the current round $S(r, 1)$, generating from the first transrandomized Substitution box for the current round r $S(r, 1)$ a N-1th transrandomized Substitution box for the current round r $S(r, N-1)$ by performing iteratively N-2 times a step of generation of a ith transrandomized Substitution box for the current round r $S(r, i)$ from a i−1th transrandomized substitution box for the current round r $S(r, i-1)$ and from a plurality of masks $m_{r,i}$, $m'_{r,i}$, $m_{r,i-1}$, $m'_{r,i-1}$ such that $S(r, i)[x]=S(r,i-1)[x \text{ xor } (m_{r,i-1} \text{ xor } m_{r,i})]$ xor $(m'_{r,i-1} \text{ xor } m'_{r,i})$ for any input value x of the ith transrandomized substitution box for the current round $S(r, 1)$, with i an integer comprised in $\{2, \ldots N-1\}$, and using the N−1th transrandomized Substitution box for the current round r $S(r, N-1)$ instead of the initial Substitution box $S_0$ in said current round r of the cryptographic process.

18. The cryptographic device of claim 9, wherein a memory scrambling is performed to generate the transrandomized Substitution box $S(r,i)$ at round r with i an integer comprised in $\{1, \ldots N-1\}$.

\* \* \* \* \*